United States Patent [19]

Goodman et al.

[11] 4,306,990

[45] Dec. 22, 1981

[54] CLEANING AND PROTECTIVE COMPOSITION AND METHOD

[75] Inventors: Edward Goodman, 1315 Club Dr., Hewlett Harbor, N.Y. 11557; James P. Dux; Fred R. Albright, both of Lancaster, Pa.

[73] Assignee: Edward Goodman, New York, N.Y.

[21] Appl. No.: 170,119

[22] Filed: Jul. 18, 1980

[51] Int. Cl.$^3$ .................. C09D 9/00; C08L 83/04; C11D 7/30
[52] U.S. Cl. .............................. 252/174.15; 252/162; 252/171; 252/172; 252/DIG. 8; 252/DIG. 10; 134/6; 134/39; 134/40; 427/290; 427/387; 260/33.85 B
[58] Field of Search ........... 252/162, 171, 172, 174.15, 252/DIG. 8, DIG. 10; 427/387; 428/290; 134/6, 39, 40

[56] References Cited

U.S. PATENT DOCUMENTS

| | | | |
|---|---|---|---|
| 2,807,601 | 9/1957 | Dennet | 428/290 |
| 2,927,870 | 3/1960 | Beutler | 427/387 |
| 2,985,544 | 5/1961 | de Monterey et al. | 427/387 X |
| 3,009,833 | 11/1961 | Sommerville | 427/387 |
| 3,058,850 | 10/1962 | Sell | 427/387 |
| 3,336,158 | 8/1967 | Wade et al. | 427/387 |
| 3,418,162 | 12/1968 | Adachi | 427/387 |
| 3,423,236 | 1/1969 | Quaal | 427/387 |
| 3,436,252 | 4/1969 | Neuroth | 428/447 |
| 3,637,427 | 1/1972 | Tsuruta et al. | 427/387 X |
| 3,730,762 | 5/1973 | Deiner et al. | 427/387 |
| 4,151,344 | 4/1979 | Doss et al. | 427/387 X |
| 4,197,138 | 4/1980 | Sniffew et al. | 252/172 X |

Primary Examiner—Mayer Weinblatt
Attorney, Agent, or Firm—Lackenbach, Siegel, Marzullo, Presta & Aronson

[57] ABSTRACT

An improved composition suitable for cleaning and protecting various substrates, comprising 1,1,1-trichloroethane, poly-(methylhydrosiloxane), tin octoate and zinc octoate.

16 Claims, No Drawings

CLEANING AND PROTECTIVE COMPOSITION AND METHOD

BACKGROUND OF THE INVENTION

This invention relates to an improved composition for cleaning and protecting various textile fibers and fabrics, and hard surfaces and coatings. The invention also includes a method for using the improved composition for its intended purpose in one application.

A variety of products are known which relate to various compositions for treating fibrous materials for a number of purposes, including cleaning, and/or applying a protective coating to make them water repellent and/or stain resistant.

U.S. Pat. No. 3,009,833 to Somerville discloses a composition for treating fibrous materials to make them water repellent. The composition includes a methylpolysiloxane fluid, an organotin oxide, and a metal octoate. The treatment medium can be in the form of an aqueous emulsion, or a solution in an organic solvent such as toluene, acetone, white spirits, isopropanol, and the like. Once the fabric or paper has been contacted with the siloxane composition, the temperature is raised to a temperature not greater than 150° C. to cure the polysiloxane. The coating obtained is supposed to be durable to laundering, solvent rinsing, and the like.

U.S. Pat. No. 2,807,601 to Dennet relates to an organo-silicon composition useful in treating organic fabrics with hydroxylated siloxane compositions to provide water repellency to fabrics along with resistance to grease spotting and solvent spotting, and shrinking of wool during laundering. The organo-silicon compositions are applied to fabrics in amounts such that the "pick up" ranges from 0.1 to 5 percent, and can be applied in any desired manner such as by dipping or spraying, or in the form of solutions or emulsions. After application of the organo-silicon compositions, the fabric is heated to remove any solvent or water and to cure the siloxane. The heating temperatures vary from 100°–475° F. for periods of from 5 seconds to one hour. Curing catalysts such as zinc or iron octoate, lead-2-ethylhexoate, and the like, can be employed to aid in the curing of the siloxane. The siloxane composition can be employed in suitable solvent media such as benzene, toluene, and petroleum hydrocarbons.

U.S. Pat. No. 3,423,236 to Quaal discloses the use of siloxane copolymers to impart water repellency to various substrates such as fabrics, paper, glass, leather, wood and masonry. The siloxane copolymer is generally applied in a solvent solution using such organic solvents as toluene, perchloroethylene, hexane, acetone, isopropanol, ethanol, and methanol. The siloxane copolymer can also be applied to fabrics from aqueous emulsions or by means of aerosol application. In instances where the siloxane copolymers are applied to fabrics, curing is accomplished with a catalyst at temperatures of 30°–260° C. and the fabric's water repellency is supposed to last through several washings. Suitable catalysts include metal carboxylates, such as zinc octoate.

U.S. Pat. No. 2,927,870 to Beutler discloses the treatment of fabrics of synthetic and natural fiber origin with organo-siloxane emulsions containing catalysts, to provide water repellency. The composition uses a combination of zirconium acetate and zinc acetate as catalysts in the organo-siloxane emulsion.

U.S. Pat. No. 3,418,162 to Adachi discloses a composition and process for manufacturing waterproof cloth with a composition that includes organo-polysiloxanes, aminoalkyloxysilanes, an organotin compound, and an organic catalyst. The treated waterproof cloth is supposed to have a coating of silicone resin which is not attacked by organic solvents such as trichloroethylene.

U.S. Pat. No. 3,336,158 to Wada et al discloses a method for making various articles, including fabrics, water-repellent by applying a metallic compound in admixture with a catalyst such as zinc acetate or zinc formate in combination with a polysiloxane. The treated articles are allowed to dry for a day or two at room temperature, presumably to effect a cure.

U.S. Pat. No. 3,058,850 to Sell discloses a method for making textile fabrics water-repellent by treating with a polymerizable silicone material and a zirconium salt of an organic acid. The composition can be applied in the form of an emulsion with the assistance of various organic solvents.

U.S. Pat. No. 3,445,418 to Gibbon et al discloses organo-silicon compositions for depositing films on paper and other materials. The composition includes a linear organo-polysiloxane, a tin salt of a carboxylic acid, an organic solvent, and water.

U.S. Pat. No. 3,436,252 to Neuroth discloses a release composition for paper comprising a linear organo-polysiloxane, a metal salt of a carboxylic acid, and various organic solvents.

U.S. Pat. No. 2,985,544 to de Monterey et al discloses a method for making paper and paper products non-adherent to normally adherent materials, such as tars, waxes, pastes, and the like, by means of treating the paper products with a polysiloxane composition containing a polyvinyl alcohol emulsifying agent and dibutyl tin laurate.

U.S. Pat. No. 3,730,762 to Deiner et al discloses a method for improving the slipping resistance and delustering of textiles.

U.S. Pat. No. 3,637,427 to Tsuruta et al discloses a process for waterproofing fabrics with organo-polysiloxanes.

SUMMARY OF THE INVENTION

In accordance with the present invention, an improved cleaning and protective composition, comprising poly-(methylhydrosiloxane), tin octoate, zinc octoate and 1,1,1-trichloroethane can be used to clean and protect various materials, including textile fibers and fabrics, and hard surfaces and coatings.

DESCRIPTION OF THE PREFERRED EMBODIMENT

The improved cleaning and protective composition of the present invention includes poly-(methylhydrosiloxane) zinc octoate, and 1,1,1-trichlorethane. The composition generally exists in the following proportions:

| COMPONENT | PERCENT BY WEIGHT | PREFERRED % |
| --- | --- | --- |
| 1,1,1-trichlorethane | 86–99.798 | 91.6–99.44 |
| Poly-(methylhydrosiloxane) | 0.2–10 | 0.5–6.0 |
| Tin Octoate | .001–2.0 | .03–1.2 |
| Zinc Octoate | .001–2.0 | .03–1.2 |

The trichloroethane is believed to function as a solvent or carrier, and the tin octoate and zinc octoate are believed to function as catalysts which promote curing of the poly-(methylhydrosiloxane).

It has been found the inventive composition cleans and protects various materials or substrates in one application. These substrates include textile fibers and fabrics, such as nylon, wool, polyester, fiberglass, acrylic and cotton; fabric floor coverings including wool, nylon, acrylic, polyester and blends; suede and leather; hard surfaces including glass, plastics, metals, ceramics, tile; porous surfaces including wood, concrete and cement; and coatings including wall coverings and paints.

The cleaning and protection treatment for dirty or soiled substrates, involves, in general, the contacting of a suitable amount of the composition as a liquid or spray on the substrate. By suitable amount is meant the amount necessary to clean the dirty or soiled substrate. During the process of cleaning, it is believed that a protective film or coating forms on the substrate. This protective coating also simplifies and makes easier subsequent cleaning in terms of time and effort necessary to remove dirt or soiling from the substrate.

It has been found that the inventive composition provides water repellency and oil and grease resistant properties to the treated substrate, thereby affording protection against both water based stains and oily and grease based stains.

Unique advantages of the inventive composition include the fact that it is non-flammable and non-carcinogenic, it does an excellent job of cleaning and protecting, and it does it in one application.

The poly-(methylhydrosiloxane) component of the inventive composition has the following chemical structure:

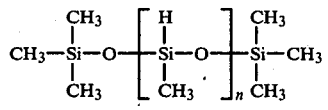

Where n is less than 1,000, preferably less than 20. This polymer is available commercially from, for example, Dow Corning Corporation, as "Dow Corning 1107 ® fluid". It is a colorless, essentially non-toxic, silicone fluid, which when cured on surfaces of materials such as metals, glass, plastics, paper, and fabrics, forms a clear water-repellent release coating. Upon curing, the polymer cross-links at the site of the hydrogen atoms to form a resinous release coating.

Poly-(methylhydrosiloxane) is soluble in a wide variety of organic solvents, including hydrocarbon solvents, acetone and methylethylketone. However, poly-(methylhydrosiloxane) can evolve hydrogen gas under certain conditions. Thus, poly-(methylhydrosiloxane) will react with any material containing an "active hydrogen", such as alcohols or amines, to yield hydrogen as follows:

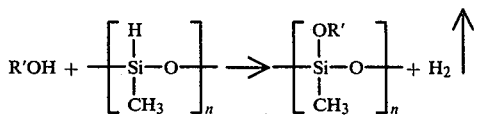

Where R'=alkyl, aryl, H.

One of the objectives of the claimed invention is to minimize this reaction, wherein hydrogen is evolved, due to its hazardous nature, and the fact that the inventive composition does not perform as well when the above reaction occurs to a substantial extent.

In this regard, selection of the proper solvent was an important consideration with regard to the operability of the inventive composition. The solvent had to be compatible with the other components of the composition. It was also important that the solvent be a cleaning agent so that the final formulation would be capable of simultaneously cleaning and protecting the substrate to which it is applied. A number of other factors were also considered in choosing 1,1,1-trichloroethane as the solvent.

It was also important that the solvent be relatively safe to use and leave no harmful or annoying residue. Petroleum distillates were not suitable because of their flammability. A potentially more hazardous situation can arise through the applicability of a composition containing flammable solvents which form flammable vapors. Most non-flammable solvents available, for example, halogenated hydrocarbons, such as chloroform, carbon tetrachloride, tetrachloroethylene, and the like, were found to be either very toxic or suspected carcinogens. The only readily available solvents that were relatively non-flammable and known to be non-carcinogenic, were methylene chloride and 1,1,1-trichloroethane.

Methylene chloride has a boiling point of 40° C. (104° F.), while 1,1,1-trichloroethane boils at 74° C. (165° F). The low boiling point of methylene chloride makes it less preferable than 1,1,1-trichloroethane, due to the fact that it rapidly vaporizes in mixing tanks, open cans, and the like, where the cleaning composition would be stored. In addition, methylene chloride can adversely affect synthetic fibers used in many fabrics.

1,1,1-trichlorethane as a solvent appeared to be the only acceptable choice which met substantially all of the requirements. However, it was found that all commercially available grades of 1,1,1-trichloroethane, with the exception of the "reagent grade" 1,1,1-trichoroethane, contained about 5 wt.% of a stabilizer. The stabilizer is necessary because the major use of 1,1,1-trichloroethane is in the degreasing of metals. In contacting metals, especially aluminum, 1,1,1-trichloroethane is unstable, and forms hydrochloric acid, which attacks the metal and can further catalyze a destabilizing reaction in accordance with the following equations:

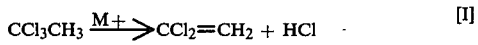 [I]

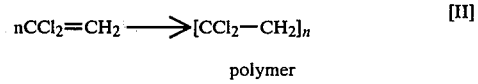 [II]

polymer where M+ =metal.

Thus, commercially available trichloroethane contains various stabilizer systems. Most of these stabilizer systems contain active hydrogen in the form of alcohols, amines, and the like. An acceptable stabilizer for 1,1,1-trichloroethane, in the present invention, which does not contain active hydrogen was found to be 1,4 dioxane. The data governing the selection of trichloroethane with the proper stabilizer is reported in Examples 1 and 2.

EXAMPLE 1

Hydrogen Gas Evolution

This example concerns a study of hydrogen gas evolution from the inventive composition utilizing various types of commercial trichloroethane containing different stabilizers.

Cleaning composition solutions were made with four different commercial types of 1,1,1-trichloroethane. These included Methyl Chloroform-314 (P.P.G. Industries, and containing a proprietary alcoholic stabilizer); Tri-Ethane-324 (P.P.G. Industries, and containing a proprietary stabilizer); Chloroethene-SM (Dow Chemical, with dioxane as a stabilizer); and Chloroethene-LS (Dow Chemical Company, a low stabilized grade of trichloroethene containing butylene oxide which more correctly functions as an acid acceptor). Solutions containing 950 milliliters of each solvent, 0.5 grams of tin octoate and 0.5 grams of zinc octoate were prepared. Each solvent solution containing the catalyst was dried over 8 grams of sodium sulfate for two hours. The solutions were filtered through glass wool into identical one gallon bottles. 73 grams of poly-(methylhydrosiloxane) (Dow 1107®) was added to each bottle. The contents in each bottle were mixed for five minutes, vented, allowed to settle, and connected to separate manometers. Trichloroethane was used as the manometer fluid and hydrogen gas evolution was monitored by the manometer fluid displacement measured in centimeters. The results are tabulated as follows:

| 1,1,1-Trichloroethane Solvents | Displacement, centimeters, 24 hours after mixing | Displacement, centimeters, during 2-hour period the following day |
|---|---|---|
| Chloroethene-SM | 30.2 | 5.0 |
| Methyl Chloroform-314 | 77.0 | 10.6 |
| Tri-Ethane-324 | 36.3 | 9.3 |
| Chloroethene-LS | 54.4 | 5.3 |

After six days, detectable quantities of hydrogen continued to evolve from the Methyl Chloroform-314 and Tri-Ethane-324 solvents, while negligible amounts evolved from the Chloroethene SM and Cloroethene-LS formulations. Chloroethene-SM, which utilizes dioxane as a stabilizer was selected as the 1,1,1-trichloroethane solvent for the inventive composition because it evolved smaller quantities of hydrogen than the other commercially available trichloroethanes. The Chloroethene-LS solvent might have been considered acceptable from the point of view of hydrogen evolution, however, it was found that because it contained no stabilizer, the formulation turned brown or even black after a few days at room temperature, and was unsuitable in the inventive composition.

EXAMPLE 2

Drying Time Study

Another important factor considered in selecting a solvent for the inventive composition was its drying time. Several relatively safe solvents which would ordinarily be considered compatible in the inventive composition were investigated with regard to their respective drying times. 0.13 milliliters of each solvent investigated was placed in a watch glass and the drying time was observed at a temperature of 69° F. and 44–46% relative humidity. The data was as follows:

| Solvent | Drying Time |
|---|---|
| Methylene Chloride | 3.18 minutes (average) |
| Trichloroethane | 6.15 minutes (average) |
| Water | over 48 hours |
| Heavy Mineral Oil | " |
| N-hexadecane | " |

The excessive drying time necessary for water, heavy mineral oil and N-hexadecane made these solvents impractical for fast drying applications. Methylene chloride was so volatile that it was not suitable in a cleaning composition used in the form of a spray. The 1,1,1-trichloroethane was selected because it was a relatively fast drying solvent and could be applied as a fine spray without evaporating before it soaked into the surface being treated.

It also appears that the catalyst system exhibits synergistic activity in the inventive composition in terms of its ability to activate the stain repellent properties more rapidly than other catalyst systems.

EXAMPLE 3

Catalyst System Study

Separate samples of polyester/cotton (65%/35%) fabric cut into 8"×8" squares, were used to evaluate the efficiency of different catalyst systems in the curing of a solution containing 94% trichloroethane and 6% poly-(methylhydrosiloxane). Four different catalyst systems were evaluated. They are identified and tabulated below together with the respective weight percents in the trichloroethane poly-(methylhydrosiloxane) solution.

| Solution # | Catalyst | Wt. % |
|---|---|---|
| 1 | Tin Octoate | 0.12 |
| 2 | Zinc Octoate | 0.12 |
| 3 | Tin Octoate | .06 |
|   | Zinc Octoate | .06 |
| 4 | Dibutyl Tin Oxide | .026 |
|   | Zinc Octoate | .094 |

Each solution composition was applied to a separate sample of polyester/cotton to the extent that 0.053 grams of poly-(methylhydrosiloxane) were uniformly added to each fabric. The water repellent properties of each sample (designated by the solution number used to treat the fabric) were evaluated in accordance with the American Association of Textile Chemists and Colorists (AATCC) Test Method 22-1977. This test evaluates the water repellent properties of fabrics on a 6 point scale corresponding to 0, 50, 70, 80, 90, and 100% water repellency. In the test data which follows, a rating of 0–50 indicates better than 0% water repellency, but less than 50%, and so on. The water repellency data is tabulated below.

| Solution # | % Water Repellency | | |
|---|---|---|---|
|  | 6 days | 12 days | 27 days |
| 1 | 0–50 | 50 | 70 |
| 2 | 0–50 | 50 | 80 |
| 3 | 50 | 70 | 80 |
| 4 | 0–50 | 70 | 80 |

The data shows that the most rapid cure was effected by the composition of solution number 3 containing the dual cayalyst system consisting of tin octoate and zinc octoate.

In a separate experiment, 0.6% dibutyl tin dilaurate was compared with a catalyst system consisting of 0.30% tin octoate and 0.30% zinc octoate, at the same trichloroethane and poly-(methylhydrosiloxane) concentrations as before, and the same poly-(methylhydrosiloxane) level on the fabrics. Samples of polyester/cotton blend fabrics, 8"×8" were used and the test specimens, each containing the respective compositions with the different catalyst systems, were heated for ½ hour at 63° C. The tin/zinc catalyst system had a AATCC water repellency value of 50, whereas the dibutyl tin dilaurate system had a water repellency rating of 0. After three days at room temperature, the tin/zinc catalyst system treated fabric had a rating of 70, while the dibutyl tin dilaurate rating was 0–50.

It has also been found that the greater the concentration of the tin octoate-zinc octoate catalyst system, the faster the rate of cure for the composition to perform effectively. The ratio of tin octoate to zinc octoate can vary from 0.1–99.99.99–.01, respectively, preferably 1:1.

In using the inventive composition for cleaning and protecting various substrates, it has been found in certain instances, such as when the composition is applied to rugs and carpets, a more rapid cure is desirable. This is due to the fact that while the formulation is in an uncured state, soil can have a tendency to adhere to the surface of carpets and rugs. However, at too high a ratio of catalyst to poly-(methylhydrosiloxane), e.g. above 1:12, by wt., respectively, gelation can occur in the inventive composition during storage, leading to a poor shelf life.

Therefore, in those instances where a more rapid cure rate is desired, and where the catalyst to siloxane ratio is greater than 1:12, the catalyst solution is kept separate from the other components of the inventive composition until shortly before use is contemplated. The catalyst can then be conveniently mixed with the rest of the composition, and applied in any suitable manner, i.e., as a spray or liquid, and the like.

EXAMPLE 4

Catalyst Concentration vs. Cure Rate

Four different fabric samples were treated with a composition consisting of 94 wt.% 1,1,1-trichloroethane, 6 wt.% poly-(methylhydrosiloxane), and increasing amounts of the tin octoate/zinc octoate dual catalyst system. The respective compositions are tabulated below and identified by solution number.

| Solution # | Catalyst Wt. % | |
|---|---|---|
|  | % Tin Octoate | % Zinc Octoate |
| 1 | 0.03 | 0.03 |
| 2 | .06 | .06 |
| 3 | .15 | .15 |
| 4 | .30 | .30 |

The respective water repellency values of each sample were tested in accordance with the AATCC Water Repellency Test 22-1977, and the results were as follows:

| Solution | % Water Repellency (AATCC Test Method 22-1977) | | | | | | | |
|---|---|---|---|---|---|---|---|---|
|  | 2 hrs. | 1 day | 2 days | 3 days | 7 days | 12 days | 27 days | 50 days |
| 1 | 0 | 0 | 0 | 0 | 0–50 | 50 | 70 | 80 |
| 2 | 0 | 0 | 0 | 0 | 50 | 70 | 80 | 90 |
| 3 | 0 | 0–50 | 50 | 50 | 50–70 | 70 | 80 | 90–100 |
| 4 | 0 | 50 | 50–70 | 70 | 70–90 | 70–90 | 90 | 100 |

The following examples demonstrate various other embodiments of the present invention. All parts and percentages are by weight unless otherwise noted.

EXAMPLE 5

Water Repellency Test On Upholstery Fabric Material

An office chair upholstered in polyester/cotton sheeting was treated with a composition consisting of 94% trichloroethane, 6% poly-(methylhydrosiloxane), 0.03% tin octoate and 0.03% zinc octoate. The chair was then subjected to 3 months of daily use, after which time the AATCC Water Repellency Test 22-1977 was administered to measure the water repellent properties of the chair. The treated area of the chair gave a value of 50+, and water-based stains, such as that of wine, beaded and wiped clean. This compared to untreated material which gave a value of 0.

EXAMPLE 6

Test On Institutional Carpet

An 11'×3' tightly tufted nylon carpet was divided into three equal sections. One section was untreated, one section was treated with a composition consisting of 94% trichloroethane, 6% poly-(methylhydrosiloxane), 0.03% tin octoate and 0.03% zinc octoate at an application rate of 100 square yards per gallon of composition. The third section was treated with the same composition at an application rate of 50 square yards per gallon of composition. The carpet was placed in the hallway of a commercial laboratory and a counter recorded the number of steps walked on it. In a 90-day period, 17,000 steps were recorded. Samples from each section were then shampooed with a commercial rug shampoo containing lauryl sulfate. The samples were then dried for 2 hours at 105° C. Each sample was then compared for its resistance to wine stains. Wine wetted the untreated sample through to the backing layer. Wiping removed very little stain and cleaning it was difficult with soap and water. Both treated samples repelled the wine causing much of it to bead on the surface. Visual observation indicated that the sample treated with the higher concentration provided better protection in terms of repelling wine stains, and was easier to clean.

EXAMPLE 7

Stain Release Protection Of Tie Fabric

8"×8" squares of tie fabric materials made of polyester, cotton, wool and silk were treated with a composition consisting of 94% trichloroethane, 3% poly-(methylhydrosiloxane), 0.15% tin octoate and 0.15% zinc octoate. The composition was applied to these fabrics on the basis of grams of poly-(methylhydrosiloxane) applied per square yard of fabric. The applications were as follows:

Polyester and Cotton (grams of poly-(methylhydrosiloxane) per square yard of fabric): 0, 1.0, 1.3, 1.6, 2.2, 3.2.

Wool and Silk (grams of poly-(methylhydrosiloxane) per square yard of fabric): 0, 1.6, 3.2, 4.3.

The fabrics were then stained in separate areas with red wine, ketchup, mustard, and mayonnaise. The ease of removal of each stain was subjectively evaluated. In all cases, wine was easily removed from the treated sample by simple blotting of the stain which beaded up on the surface of the fabric. In the untreated fabrics, the wine was absorbed and could not be removed by blotting. In the case of mustard, ketchup and mayonnaise stains, the minimum level of coverage necessary to permit easy cleaning with soap and cold water was determined as follows:

| Fabric | Minimum "add on level" (grams poly-(methylhydrosiloxane per square yard of fabric) |
|---|---|
| Polyester | 2.2 |
| Cotton | 3.2 |
| Wool | 1.6 |
| Silk | 4.3 |

EXAMPLE 8

Treatment of PLEXIGLASS ®

(a) A sheet of PLEXIGLASS ® (Rohm & Haas' brand of poly(methylmethacrylate), ¼" thick was cut into a 12" diameter circle and heavily abraded with emery cloth. ½ of the abraded circle was treated with a solution of 99% trichloroethane, 0.5% poly-(methylhydrosiloxane), 0.025% tin octoate and 0.025% zinc octoate, by depositing a few drops on the PLEXIGLASS ® and spreading with a dry cloth. The treated portion of the PLEXIGLASS ® was noticeably more transparent.

(b) A PLEXIGLASS ® window in a storm door which was heavily marked with fingerprints and scratches accumulated through daily use was cleaned with a solution of the identical composition used in (a). The fingerprints were easily removed and the scratches were substantially less noticeable.

(c) A motorcycle windscreen was heavily encrusted with insect residue. It was cleaned with difficulty by scraping with a knife. The windscreen was then treated with a solution of 99% trichloroethane, 0.5% poly-(methylhydrosiloxane), 0.025% zinc octoate and 0.025% tin octoate, by wiping with a cloth soaked with the solution. After treatment, the motorcycle was then taken out on the road and subjected to the same conditions which had originally caused the windscreen to become heavily encrusted with insect residue. It was found that the extent of insect encrustation was diminished and easily removed by simple wiping with a damp cloth.

EXAMPLE 9

Glass (a) A 50 milliliter Erlenmeyer flask was treated with a solution of 99% trichloroethane, 0.5% poly-(methylhydrosiloxane), 0.0025% zinc octoate and 0.0025% tin octoate by filling the flask, emptying it, and allowing it to dry. Approximately 10 grams of dry garden soil were added to the flask and an equivalent amount of the same soil to an untreated flask. Both flasks were vigorously shaken and then observed. Dirt did not adhere to the walls of the flask which contained the inventive composition. However, it was observed that fine particles of soil adhered to the walls of the untreated flask. This observation was confirmed by tests on windows which led to the conclusion that in treating glass surfaces with the inventive composition, they did not seem to soil as readily as untreated glass.

(b) A glass storm window was treated with a composition similar to that in (a) and exposed to the elements over a four-month period. During inclement weather, when it rained or snowed, it was visually observed that water formed much smaller beads on the surface of the treated window compared to an untreated window, and the beads did not coalesce and streak the window.

(c) Several large mirrors in public areas were cleaned with a composition similar to that used in (a). The mirrors were subjected to regularly scheduled cleanings by a maintenance crew. It was noted that after cleaning with the inventive composition, subsequent cleanings during the regularly scheduled maintenance were made easier due to the fact that the soil could be easily removed with a damp cloth resulting in substantial time-saving in maintaining the cleanliness of the mirrors, and a saving in cleaning materials.

EXAMPLE 10

Metal

A brass nut about ¾" in diameter was immersed in a solution of 97% trichloroethane, 3% poly-(methylhydrosiloxane), 0.015% zinc octoate and 0.015% in tin octoate. A second brass nut was left untreated as a control. Each nut was suspended in the fumes over a beaker of aqua regia for a few minutes, and then exposed to fumes from a 24% $(NH_4)_2S$ solution for a few minutes to simulate natural corrosion. The untreated nut turned a greenish brown color, while the treated nut showed only a slight color change.

EXAMPLE 11

Painted Surface

A white painted metal storm door located at the entrance to a commercial laboratory was heavily soiled with fingerprints and handprints. The door was easily cleaned with a cloth soaked with a solution of 94% trichloroethane, 6% poly-(methylhydrosiloxane), 0.03% zinc octoate and 0.03% tin octoate. After eight months of daily usage and exposure to the elements, the door was observed to be clean and unmarked.

EXAMPLE 12

Phonograph Records

A long-playing phonograph record was wiped with a cloth soaked solution of 97% trichloroethane, 3% poly-(methylhydrosiloxane), 0.015% zinc octoate and 0.015% tin octoate. The record was then placed on a phonograph and deliberately scratched by drawing the diamond needle across the record surface transverse to the grooves. The record was then played with no ascertainable loss in musical quality, or discernible distortion or sounds from the scratching. The same scratching procedure was repeated, the record replayed without any observable loss in quality.

We claim:

1. A method for cleaning and protecting substrates selected from the group consisting of wood, fiberglass, fabric floor coverings, wall coverings, textiles, glass, suede, leather, tile, plastics, ceramics, paint, masonry and metals by contacting said substrate for a sufficient time and temperture with an effective amount of the following composition:

| Component | % By Weight |
|---|---|
| 1,1,1-trichloroethane | 86–99.798 |
| Poly-(methylhydrosiloxane) | 0.2–10 |
| Tin Octoate | 0.001–2.0 |
| Zinc Octoate | 0.001–2.0 | wherein the 1,1,1-trichloroethane is stabilized with an effective amount of dioxane, and where the poly-(methylhydrosiloxane) component has the structure:

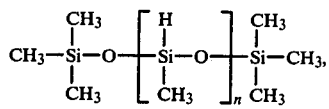

where n is less than 1,000.

2. The method of claim 1, wherein the dioxane stabilizer is present in the trichloroethane in an amount less than 10% by weight.

3. The method of claim 1, wherein said substrate is a fabric floor covering.

4. The method of claim 1, wherein said substrate is a wall covering.

5. The method of claim 1, wherein said substrate is a textile.

6. The method of claim 1, wherein said substrate is glass.

7. The method of claim 1, wherein said substrate is leather.

8. The method of claim 1, wherein said substrate is tile.

9. The method of claim 1, wherein said substrate is a plastic.

10. The method of claim 1, wherein said substrate is a ceramic.

11. The method of claim 1, wherein said substrate is a paint coating.

12. The method of claim 1, wherein said substrate is masonry.

13. The method of claim 1, wherein said substrate is a metal.

14. A cleaning and protecting composition consisting essentially of:

| Component | % By Weight |
|---|---|
| 1,1,1-trichloroethane | 86–99.798 |
| Poly-(methylhydrosiloxane) | 0.2–10 |
| Tin Octoate | 0.001–2.0 |
| Zinc Octoate | 0.001–2.0 | wherein the 1,1,1-trichloroethane is stabilized with an effective amount of dioxane, and where the poly-(methylhydrosiloxane) component has the structure:

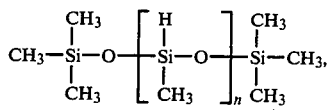

where n is less than 1,000.

15. The composition of claim 14, wherein the dioxane stabilizer is present in the trichlorethane in an amount of less than 10% by weight.

16. The composition of claim 14, in the form of a spray.

* * * * *